United States Patent [19]

Shen et al.

[11] 3,892,769

[45] July 1, 1975

[54] ACETAMINOPHEN ESTERS OF ARYL SALICYLIC ACIDS

[75] Inventors: Tsung-Ying Shen, Westfield; Howard Jones, Holmdel; Dennis M. Mulvey, Milford, all of N.J.

[73] Assignee: Merck & Co., Inc., Rahway, N.J.

[22] Filed: July 20, 1973

[21] Appl. No.: 381,123

[52] U.S. Cl. .... 260/326.13 R; 260/473 S; 424/274; 424/309
[51] Int. Cl.² ................. C07D 27/00; C07D 27/56
[58] Field of Search ........ 260/326.3, 326.41, 473 S, 260/326.13 R

[56] References Cited
UNITED STATES PATENTS
3,427,305   2/1969   Chinn .............................. 260/239.6

Primary Examiner—Elbert L. Roberts
Attorney, Agent, or Firm—William H. Nicholson; Harry E. Westlake, Jr.

[57] ABSTRACT

Acetaminophen esters of phenyl- and pyrrolylsalicylic acids are prepared by esterification of O-acyl or O-benzyl phenyl- and pyrrolylsalicylic acids followed by hydrogenolysis of the O-benzyl group. The products are useful as antiinflammatory, antipyretic and analgesic agents.

5 Claims, No Drawings

ACETAMINOPHEN ESTERS OF ARYL SALICYLIC ACIDS

This invention relates to acetaminophen esters of aryl salicylic acids, their utility as antiinflammatory, antipyretic and analgesic agents, and to a process for their preparation.

In particular, it relates to compounds of structural formula:

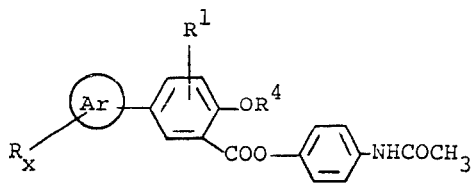

wherein
Ar is phenyl or pyrrolyl;
$R^1$ is hydrogen or $C_{1-5}$ loweralkyl;
R is halo, such as chloro or fluoro;
X is an integer from 0–5; and
$R^4$ is hydrogen, benzyl or $C_{2-3}$ alkanoyl.

Of particular interest as antiinflammatory compounds are those wherein Ar is phenyl, R is fluoro, and $R^1$ is hydrogen, and also where Ar is 1-pyrrolyl and $R^1$ and R are both hydrogen.

The novel compounds of this invention are prepared by esterifying the carboxyl group of an arylsalicylic acid with the phenolic hydroxyl of acetaminophen. Because the salicylic acids also carry a phenolic hydroxyl, it is desirable to block this group before conducting the esterification. Of particular utility as blocking groups are $C_{2-3}$ alkanoyl, for example, acetyl and benzyl.

Although any art-recognized esterification procedure may be employed, it is found convenient to cause the condensation through the influence of dicyclohexylcarbodiimide. The reaction is conducted by mixing approximately equal molar quantities of the arylsalicylic acid, acetaminophen, and dicyclohexylcarbodiimide in an inert organic solvent in which all three components are soluble, such as tetrahydrofuran or 1,2-dimethoxyethane, and aging for 8–24 hours at room temperature or up to about 50°C. The product is obtained from the reaction mixture by conventional techniques such as separation of the urea biproduct, and possibly chromatography.

Where $R^4$ in the final product is hydrogen, the corresponding compound wherein $R^4$ is benzyl is subjected to hydrogenolysis over a noble metal catalyst such as palladium or platinum in a lower alkanol such as methanol, ethanol, or propanol and under a hydrogen pressure of 30–50 p.s.i.

The novel compounds of this invention are antiinflammatory, antipyretic, and analgesic agents of value in the treatment of arthritic disorders or like conditions responsive to antiinflammatory drugs. In general, they are indicated for a wide variety of conditions where one or more of the symptoms of inflammation and pain are manifested.

For these purposes the compounds of the invention may be administered orally, topically, parenterally, by inhalation spray or rectally in dosage unit formulations containing conventional non-toxic pharmaceutically acceptable carriers, adjuvants and vehicles. The term parenteral as used herein includes subcutaneous injections, intravenous, intramuscular, intrasternal injection or infusion techniques. In addition to the treatment of warm-blooded animals such as mice, rats, horses, dogs, cats, etc., the compounds of the invention are effective in the treatment of humans.

The pharmaceutical compositions containing the active ingredient may be in a form suitable for oral use, for example, as tablets, troches, lozenges, aqueous or oily suspensions, dispersible powders or granules, emulsions, hard or soft capsules, or syrups or elixirs. Compositions intended for oral use may be prepared according to any method known to the art for the manufacture of pharmaceutical compositions and such compositions may contain one or more agents selected from the group consisting of sweetening agents, flavoring agents, coloring agents and preserving agents in order to provide a pharmaceutically elegant and palatable preparation. Tablets contain the active ingredient in admixture with non-toxic pharmaceutically acceptable excipients which are suitable for the manufacture of tablets. These excipients may be for example, inert diluents, such as calcium carbonate, sodium carbonate, lactose, calcium phosphate or sodium phosphate; granulating and disintegrating agents, for example, maize starch, or alginic acid; binding agents, for example starch, gelatine or acacia, and lubricating agents, for example magnesium stearate, stearic acid or talc. The tablets may be uncoated or they may be coated by known techniques to delay disintegration and absorption in the gastrointestinal tract and thereby provide a sustained action over a longer period. For example, a time delay material such as glyceryl monostearate or glyceryl distearate may be employed.

Formulations for oral use may also be presented as hard gelatine capsules wherein the active ingredient is mixed with an inert solid diluent, for example, calcium carbonate, calcium phosphate or kaolin, or as soft gelatine capsules wherein the active ingredient is mixed with water or an oil medium, for example peanut oil, liquid paraffin, or olive oil.

Aqueous suspensions contain the active materials in admixture wtih excipients suitable for the manufacture of aqueous suspensions. Such excipients are suspending agents, for example sodium carboxymethylcellulose, methylcellulose, hydroxypropylmethylcellulose, sodium alginate, polyvinylpyrrolidone, gum tragacanth and gum acacia; dispersing or wetting agents may be a naturally-occurring phosphatide, for example lecithin, or condensation products of an alkylene oxide with fatty acids, for example polyoxyethylene stearate, or condensation products of ethylene oxide with long chain aliphatic alcohols, for example heptadecaethyleneoxycetanol, or condensation products of ethylene oxide with partial esters derived from fatty acids and a hexitol such as polyoxyethylene sorbitol monooleate, or condensation products of ethylene oxide with partial esters derived from fatty acids and hexitol anhydrides, for example polyoxyethylene sorbitan monooleate. The said aqueous suspensions may also contain one or more preservatives, for example ethyl, or n-propyl, p-hydroxy benzoate, one or more coloring agents, one or more flavoring agents, and one or more sweetening agents, such as sucrose or saccharin.

Oily suspension may be formulated by suspending the active ingredient in a vegetable oil, for example arachis oil, olive oil, sesame oil or coconut oil, or in a mineral oil such as liquid paraffin. The oily suspensions may contain a thickening agent, for example beeswax, hard paraffin or cetyl alcohol. Sweetening agents such as those set forth above, and flavoring agents may be added to provide a palatable oral preparation. These compositions may be preserved by the addition of an antioxidant such as ascorbic acid.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example sweetening, flavoring and coloring agents, may also be present.

The pharmaceutical compositions of the invention may also be in the form of oil-in-water emulsions. The oily phase may be a vegetable oil, for example olive oil or arachis oils, or a mineral oil, for example liquid paraffin or mixtures of these. Suitable emulsifying agents may be naturally-occurring gums, for example gum acacia or gum tragacanth, naturally-occurring phosphatides, for example soya bean lecithin, and esters or partial esters derived from fatty acids and hexitol anhydrides, for example sorbitan mono-oleate, and condensation products of the said partial esters with ethylene oxide, for example polyoxyethylene sorbitan monooleate. The emulsions may also contain sweetening and flavoring agents.

Syrups and elixirs may be formulated with sweetening agents, for example glycerol, sorbitol or sucrose. Such formulations may also contain a demulcent, a preservative and flavoring and coloring agents. The pharmaceutical compositions may be in the form of a sterile injectable preparation, for example as a sterile injectable aqueous or oleagenous suspension. This suspension may be formulated according to the known art using those suitable dispersing or wetting agents and suspending agents which have been mentioned above. The sterile injectable preparation may also be a sterile injectable solution or suspension in a non-toxic parenterally-acceptable diluent or solvent, for example as a solution in 1,3-butane diol. Among the acceptable vehicles and solvents that may be employed are water, Ringer's solution and isotonic sodium chloride solution. In addition, sterile, fixed oils are conventionally employed as a solvent or suspending medium. For this purpose any bland fixed oil may be employed including synthetic mono- or diglycerides. In addition, fatty acids such as oleic acid find use in the preparation of injectables.

The compounds of the invention may also be administered in the form of suppositories for rectal administration of the drug. These compositions can be prepared by mixing the drug with a suitable non-irritating excipient which is solid at ordinary temperatures but liquid at the rectal temperature and will therefore melt in the rectum to release the drug. Such materials are cocoa butter and polyethylene glycols.

For topical use, creams, ointments, jellies, solutions or suspensions, etc., containing the anti-inflammatory agents are employed.

Dosage levels of the order to .5 mg. to 140 mg. per kilogram of body weight per day are useful in the treatment of the above-indicated conditions (25 mg. to 7 gms. per patient per day). For example, inflammation is effectively treated and anti-pyretic and analgesic activity manifested by the administration from about .1 to 50 mg. of the compound per kilogram of body weight per day (5 mg. to 3.5 gms. per patient per day). Advantageously, from about 1 mg. to about 15 mg. per kilogram of body weight per daily dosage produces highly effective results (50 mg. to 1 gm. per patient per day).

The amount of active ingredient that may be combined with the carrier materials to produce a single dosage form will vary depending upon the host treated and the particular mode of administration. For example, a formulation intended for the oral administration of humans may contain from 5 mg. to 5 gm. of active agent compounded with an appropriate and convenient amount of carrier material which may vary from about 5 to about 95 percent of the total composition. Dosage unit forms will generally contain between from about 25 mg. to about 500 mg. of active ingredient.

It will be understood, however, that the specific dose level for any particular patient will depend upon a variety of factors including the activity of the specific compound employed, the age, body weight, general health, sex, diet, time of administration, route of administration, rate of excretion, drug combination and the severity of the particular disease undergoing therapy.

EXAMPLE 1

Acetaminophen Ester of 5-(2,4-difluorophenyl)acetyl Salicylic Acid

Step A: Preparation of 5-(2,4-difluorophenyl)acetylsalicylic acid

A solution of 3.0 g. of 5-(2,4-difluorophenyl) salicylic acid in 12 ml. of pyridine and 8 ml. of acetic anhydride is heated on a steam bath for 20 minutes. The mixture is then poured onto ice, and the product extracted with methylene chloride. The extract is dried and concentrated to dryness. The residue is recrystallized from benzene to yield 5-(2,4-difluorophenyl)acetysalicylic acid, m.p. 164°–168°C.

Step B: Preparation of acetaminophen ester of 5-(2,4-difluorophenyl)acetylsalicylic acid A mixture of 2.0 g. (0.0068 mole) of 5-(2,4-difluorophenyl)acetylsalicylic acid, 0.86 g. (0.0068 mole) of acetaminophen and 1.40 g. (0.0068 mole) of dicyclohexylcarbodiimide in 100 ml. of tetrahydrofuran was aged 16 hours at room temperature. The mixture was filtered and concentrated in vacuo. The residue was slurried in 35 ml. of acetone, and the insoluble urea was separated on a filter. The acetone solution was treated with 2.5 ml. glacial acetic acid and 25 ml. of water and aged 1½ hr. to remove excess dicyclohexylcarbodiimide. The mixture was extracted with 75 ml. of methylene chloride. The extract was back-extracted with 50 ml. of saturated aqueous sodium bicarbonate, dried over magnesium sulfate and concentrated to an oil. The residue was chromatographed on silica gel by elution with chloroform-methanol (95:5 v/v). The appropriate fractions of the eluate were concentrated to an oil. The residue was extracted with 35 ml. of hot heptane, which on cooling deposited 0.120 g. of acetaminophen ester of 5-(2,4-difluorophenyl)acetylsalicylic acid as a hemisolvate, m.p. 110°–112°C.

Employing the procedure of Example 1, Steps A and B, but substituting for the 5-(2,4-difluorophenyl) salicylic acid used in Step A thereof, an equivalent amount of each of a. 5-(4-fluorophenyl)salicylic acid,
b. 5-(3-fluorophenyl)salicylic acid,
c. 5-(2-fluorophenyl)salicylic acid,
d. 5-(pentafluorophenyl)salicylic acid,
e. 5-(4-fluorophenyl)-3-methylsalicylic acid, and
f. 5-(1-pyrrolyl)salicylic acid, there is produced in Step A respectively, a. 5-(4-fluorophenyl)acetylsalicylic acid,
b. 5-(3-fluorophenyl)acetylsalicylic acid,
c. 5-(2-fluorophenyl)acetylsalicylic acid,
d. 5-(pentafluorophenyl)acetylsalicylic acid,
e. 5-(4-fluorophenyl)-3-methylacetylsalicylic acid,
f. 5-(1-pyrrolyl)acetylsalicylic acid, and in Step B, the acetaminophen esters of:
a. 5-(4-fluorophenyl)acetylsalicylic acid,
b. 5-(3-fluorophenyl)acetylsalicylic acid,
c. 5-(2-fluorophenyl)acetylsalicylic acid,
d. 5-(pentafluorophenyl)acetylsalicylic acid,
e. 5-(4-fluorophenyl)-3-methylacetylsalicylic acid, and
f. 5-(1-pyrrolyl)acetylsalicylic acid.

EXAMPLE 2

Acetaminophen Ester of
2-Benzyloxy-5-(2,4-difluorophenyl) Benzoic Acid

Step A: Preparation of methyl
2-benzoyloxy-5-(2,4-difluorophenyl)benzoate

A solution of 0.1 mole of methyl-5-(2,4-difluorophenyl)salicylate (prepared from the reaction of the corresponding carboxylic acid with one equivalent of diazomethane) in 40 ml. of methanol containing 0.1 mole of sodium methoxide is treated with 0.1 mole of benzyl bromide. The resulting solution is refluxed with stirring for 3 hours and then concentrated in vacuo. The residue is partitioned between 40 ml. water and 40 ml. ethyl acetate. After drying the ethyl acetate phase over magnesium sulfate, concentration in vacuo affords the desired benzyl ether.

Step B: Preparation of
2-benzyloxy-5-(2,4-difluorophenyl) benzoic acid

A solution of 0.1 mole of the product from Step A in 40 ml. of ethanol plus 40 ml. of 2.5 N. sodium hydroxide solution is prepared and heated at 70°C. for 2 hours. The solution is concentrated in vacuo to one-half volume and acidified with concentrated hydrochloric acid to pH 3. After chilling for 15 minutes at 10°C., the desired carboxylic acid is isolated by filtration and dried in vacuo.

Step C: Preparation of acetaminophen ester of
2-benzloxy-5-(2,4-difluorophenyl)benzoic acid Prepared by the procedure, substantially as described in Example 1, Step B, but substituting for 5-(2,4-difluorophenyl)acetylsalicylic used therein, an equivalent amount of the benzyloxy compound from Step B above.

Employing the procedure of Example 2, Steps A, B, and C, but substituting for the methyl 5-(2,4-difluorophenyl)salicylate used in Step A thereof, an equivalent amount of each of:

a. methyl 5-(4-fluorophenyl)salicylate,
b. methyl 5-(3-fluorophenyl)salicylate,
c. methyl 5-(2-fluorophenyl)salicylate,
d. methyl 5-(pentafluorophenyl)salicylate,
e. methyl 5-(4-fluorophenyl)-3-methylsalicylate, and
f. methyl 5-(1-pyrrolyl)salicylate, and in Step B:

a. 2-benzyloxy-5-(4-fluorophenyl)benzoic acid,
b. 2-benzyloxy-5-(3-fluorophenyl)benzoic acid,
c. 2-benzyloxy-5-(2-fluorophenyl)benzoic acid,
d. 2-benzyloxy-5-(pentafluorophenyl)benzoic acid,
e. 2-benzyloxy-5-(4-fluorophenyl)-3-methylbenzoic acid,
f. 2-benzyloxy-5-(1-pyrrolyl)benzoic acid, and in
Step C, the acetaminophen esters of:

a. 2-benzyloxy-5-(4-fluorophenyl)benzoic acid,
b. 2-benzyloxy-5-(3-fluorophenyl)benzoic acid,
c. 2-benzyloxy-5-(2-fluorophenyl)benzoic acid,
d. 2-benzyloxy-5-(pentafluorophenyl) benzoic acid,
e. 2-benzyloxy-5-(4-fluorophenyl)-3-methylbenzoic acid, and
f. 2-benzyloxy-5-(1-pyrrolyl)benzoic acid.

EXAMPLE 3

Acetaminophen Ester of
5-(2,4-difluorophenyl)Salicylic Acid

A solution of 0.1 mole of acetaminophen ester of 2-benzyloxy-5-(2,4-difluorophenyl)benzoic acid in 70 ml. of methanol is treated with 1 gm. of 10% palladium on carbon and shaken under 45 p.s.i. hydrogen until an equivalent of hydrogen has been absorbed. The solution is filtered and the filtrate evaporated in vacuo to afford the desired acetaminophen ester of 5-(2,4-difluorophenyl)salicylic acid.

Employing the procedure of Example 3, but substituting for the acetaminophen ester of 2-benzyloxy-5-(2,4-difluorophenyl)benzoic acid used therein, an equivalent amount of the acetaminophen ester of each of a. 2-benzyloxy-5-(4-fluorophenyl)benzoic acid,
b. 2-benzyloxy-5-(3-fluorophenyl)benzoic acid,
c. 2-benzyloxy-5-(2-fluorophenyl)benzoic acid,
d. 2-benzyloxy-5-(pentafluorophenyl)benzoic acid,
e. 2-benzyloxy-5-(4-fluorophenyl)-3-methylbenzoic acid,
f. 2-benzyloxy-5-(1-pyrrolyl)benzoic acid, there is produced respectively the acetaminopheny ester of a. 5-(4-fluorophenyl)salicylic acid,
b. 5-(3-fluorophenyl)salicylic acid,
c. 5-(2-fluorophenyl)salicylic acid,
d. 5-(pentafluorophenyl)salicylic acid,
e. 5-(4-fluorophenyl)-3-methylsalicylic acid, and
f. 5-(1-pyrrolyl)salicylic acid.

EXAMPLE 4

A mixture of 250 parts of acetaminophen ester of 5-(2,4-difluorophenyl)salicylic acid and 25 parts of lactose is granulated with suitable water, and to this is added 100 parts of maize starch. The mass is passed through a 16 mesh screen. The granules are dried at a temperature below 60°C. The dry granules are passed through a 16 mesh screen, and mixed with 3.8 parts of magnesium stearate. They are then compressed into tablets suitable for oral administration.

The specific acetaminophen ester used in the foregoing example may be replaced by 25, 100, 250, or 500 parts of other acetaminophen esters of this invention to produce tablets suitable for oral administration according to the method of this invention.

EXAMPLE 5

A mixture of 50 parts of acetaminophen ester of 5-(N-pyrryl)salicylic acid, 3 parts of the calcium salt of lignin sulfonic acid, and 237 parts of water is ballmilled until the size of substantially all of the particles of the acid is less than 10 microns. The suspension is diluted with a solution containing 3 parts of sodium carboxymethylcellulose and 0.9 parts of the butyl ester of p-hydroxybenzoic acid in 300 parts of water. There is thus obtained an aqueous suspension suitable for oral administration for therapeutic purposes.

EXAMPLE 6

A mixture of 250 parts of acetaminophen ester of 5-(4-fluorophenyl)salicylic acid, 200 parts of maize starch and 30 parts of alginic acid is mixed with a sufficient quantity of 10% aqueous paste of maize starch, and granulated. The granules are dried in a current of warm air and the dry granules are then passed through a 16-mesh screen, mixed with 6 parts of magnesium stearate and compressed into tablet form to obtain tablets suitable for oral administration.

EXAMPLE 7

A mixture of 500 parts acetaminophen ester of 5-(2,4-difluorophenyl)acetylsalicylic acid, 60 parts maize starch and 20 parts of gum acacia is granulated with a sufficient quantity of water. The mass is passed through a 12-mesh screen and the granules are dried in a current of warm air. The dry granules are passed through a 16-mesh screen, mixed with 5 parts of magnesium stearate and compressed into tablet form suitable for oral administration.

EXAMPLE 8

1. Tablets — 10,000 scored tablets for oral use, each containing 500 mg. of active ingredient are prepared from the following ingredients:

|  | Gm. |
| --- | --- |
| acetaminophen ester of 5-pentafluorophenyl)salicylic acid | 5000 |
| Starch, U.S.P. | 350 |
| Talc, U.S.P. | 250 |
| Calcium stearate | 35 |

The powdered active ingredient is granulated with 4% w./v. aqueous solution of methylcellulose U.S.P. (1,500 cps.). To the dried granules is added a mixture of the remainder of the ingredients and the final mixture compressed into tablets of proper weight.

2. Capsules — 10,000 two-piece hard gelatine capsules for oral use, each containing 250 mg. of active ingredient are prepared from the following ingredients:

|  | Gm. |
| --- | --- |
| acetaminophen ester of 2-benzyloxy-5-(2,4-difluorophenyl)benzoic acid | 2500 |
| Lactose, U.S.P. | 1000 |
| Starch, U.S.P. | 300 |
| Talc, U.S.P. | 65 |
| Calcium stearate | 25 |

The powdered active ingredient is mixed with the starch-lactose mixture followed by the talc and calcium stearate. The final mixture is then encapsulated in the usual manner. Capsules containing 10, 25, 50, and 100 mg. of active component are also prepared by substituting 100, 25, 500, and 1000 gm. for 2500 gm. in the above formulation.

3. Soft elastic capsules — One-piece soft elastic capsules for oral use, each containing 200 mg. of active material are prepared in the usual manner by first dispersing the powdered active material in sufficient corn oil to render the material capsulatable.

4. Aqueous suspension — An aqueous suspension for oral use containing in each 5 ml. 1 gm. of active ingredient is prepared from the following ingredients:

|  | Gm. |
| --- | --- |
| acetaminophen ester of 5-(2,4-difluorophenyl)acetylsalicylic acid | 2000 |
| Methylparaben, U.S.P. | 7.5 |
| Propylparaben, U.S.P. | 2.5 |
| Saccharin sodium | 12.5 |
| Glycerin | 3000 |
| Tragacanth powder | 10 |
| Orange oil flavor | 10 |
| F.D. & C. orange dye | 7.5 |
| Deionized water, q.s. to 10,000 ml. | |

What is claimed is:

1. A compound of structural formula:

[Structural formula showing $R_x$—(Ar)—phenyl ring with $R^1$, $OR^4$, and $COO$—phenyl—$NHCOCH_3$ substituents]

wherein
 Ar is phenyl or pyrrolyl;
 $R^1$ is hydrogen or $C_{1-5}$ alkyl;
 R is chloro or fluoro;
 X is an integer from 0–5; and
 $R^4$ is hydrogen, benzyl, or $C_{2-3}$ alkanoyl.

2. The compound of claim 1 of formula:

[Structural formula showing $R_x$—phenyl—phenyl with $OR^4$ and $COO$—phenyl—$NHCOCH_3$ substituents]

wherein
 R is fluoro;
 X is 1–5; and
 $R^4$ is hydrogen or acetyl.

3. The compound of claim 1 of formula:
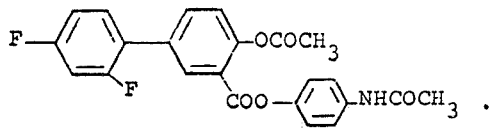
4. The compound of claim 1 of formula:
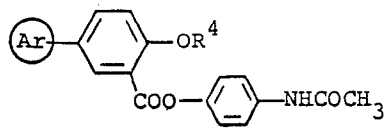
wherein
Ar is pyrrolyl; and
$R^4$ is hydrogen or acetyl.
5. The compound of claim 4 wherein Ar is 1-pyrrolyl.
* * * * *